United States Patent
Bianco et al.

(10) Patent No.: US 9,461,558 B2
(45) Date of Patent: Oct. 4, 2016

(54) CONTROL DEVICE OF A SWITCHING POWER SUPPLY

(71) Applicants: DORA S.p.A., Aosta (IT); STMicroelectronics S.r.l., Agrate Brianza (IT)

(72) Inventors: Alberto Bianco, Gressan (IT); Claudio Adragna, Monza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 189 days.

(21) Appl. No.: 13/749,533

(22) Filed: Jan. 24, 2013

(65) Prior Publication Data
US 2013/0194845 A1    Aug. 1, 2013

(30) Foreign Application Priority Data

Jan. 26, 2012 (IT) ............................. MI2012A0088

(51) Int. Cl.
*H02M 5/42* (2006.01)
*H02M 7/04* (2006.01)
(Continued)

(52) U.S. Cl.
CPC ........... *H02M 7/217* (2013.01); *H02M 1/4225* (2013.01); *Y02B 70/126* (2013.01)

(58) Field of Classification Search
CPC ...... H02M 1/42; H02M 1/44; H02M 1/4208; H02M 1/4216; H02M 1/4225; H02M 1/4233; H02M 1/4241; H02M 1/4251; H02M 1/4258; H02M 1/4266; H02M 7/217; H02M 3/155; H02M 3/158; H02M 3/1588; H02M 3/145; H02M 3/156; H02M 3/157; H02M 2001/009; H02M 2001/0025; H02M 2003/1552; H02M 2003/156; H02M 7/127; H02M 1/14; Y02B 70/12; Y02B 70/123; Y02B 70/126; Y02B 70/1475
USPC ............ 363/21.02–21.03, 74, 78–80, 84, 89, 363/90, 124–127; 323/205–211, 222–226, 323/242–244, 271–275, 282–288, 299, 323/351; 327/131–141
See application file for complete search history.

(56) References Cited

U.S. PATENT DOCUMENTS 5,367,247 A    11/1994  Blocher et al.
5,479,336 A    12/1995  Motoki et al.
(Continued)

FOREIGN PATENT DOCUMENTS

EP    1387476 A1    2/2004

OTHER PUBLICATIONS

Langeslag, W. et al., "VLSI Design and Application of a High-Voltage-Compatible SoC-ASIC in Bipolar CMOS/DMOS Technology for AC-DC Rectifiers," IEEE Transactions on Industrial Electronics 54(5):2626-2641, Oct. 2007.
(Continued)

*Primary Examiner* — Timothy J Dole
*Assistant Examiner* — Carlos Rivera-Perez
(74) *Attorney, Agent, or Firm* — Seed IP Law Group PLLC

(57) ABSTRACT

A control device of a switching converter controls the closing and opening of a switch of the converter that regulates the operation of an inductor. The control device includes a ramp voltage generator, a switch control circuit configured to close the switch based on a comparison of the ramp voltage with a first signal and a generator control circuit configured to control the ramp voltage generator based on a value of a second signal representative of a current flowing through the inductor of the converter, in comparison with the value of a third signal.

23 Claims, 4 Drawing Sheets

(51) Int. Cl.
    *H02M 7/68* (2006.01)
    *G05F 1/00* (2006.01)
    *H02M 7/217* (2006.01)
    *H02M 1/42* (2007.01)

(56) References Cited

U.S. PATENT DOCUMENTS

| | | | |
|---|---|---|---|
| 6,191,565 B1 * | 2/2001 | Lee et al. | 323/222 |
| 6,259,614 B1 | 7/2001 | Ribarich et al. | |
| 6,307,361 B1 | 10/2001 | Yaakov et al. | |
| 6,842,353 B2 | 1/2005 | Yamada et al. | |
| 7,106,038 B1 * | 9/2006 | Xin-LeBlanc | 323/288 |
| 7,307,405 B2 | 12/2007 | Adragna et al. | |
| RE40,016 E | 1/2008 | Ribarich et al. | |
| 7,345,464 B2 * | 3/2008 | Steele | 323/288 |
| 7,541,795 B1 | 6/2009 | Smith et al. | |
| 7,592,791 B2 | 9/2009 | Emira | |
| 8,467,209 B2 * | 6/2013 | Adragna | 363/89 |
| 2004/0095101 A1 | 5/2004 | Pidutti et al. | |
| 2004/0263140 A1 | 12/2004 | Adragna et al. | |
| 2006/0013026 A1 | 1/2006 | Frank et al. | |
| 2006/0208789 A1 | 9/2006 | Shimada | |
| 2008/0246444 A1 | 10/2008 | Shao et al. | |
| 2008/0272748 A1 | 11/2008 | Melanson | |
| 2008/0304195 A1 | 12/2008 | Lin | |
| 2010/0110593 A1 | 5/2010 | Kim et al. | |
| 2010/0165683 A1 * | 7/2010 | Sugawara | 363/126 |
| 2010/0315838 A1 * | 12/2010 | Mao et al. | 363/16 |
| 2011/0157940 A1 | 6/2011 | Zhang | |
| 2012/0262082 A1 | 10/2012 | Esaki et al. | |

OTHER PUBLICATIONS

Kim, J.W. et al., "Variable On-time Control of the Critical Conduction Mode Boost Power Factor Correction Converter to Improve Zero-crossing Distortion," International Conference on Power Electronics and Drives Systems, 2005 (PEDS 2005):1542-1546, Nov. 2005.

Huber, L. et al., "Effect of Valley Switching and Switching-Frequency Limitation on Line-Current Distortions of DCM/CCM Boundary Boost PFC Converters," IEEE Transactions on Power Electronics 24(2):339-347, Feb. 2009.

Adragna, "Control Loop Modeling of L6561-Based TM PFC," Application Note AN1089, STMicroelectronics, Mar. 2000, 12 pages.

Unitrode Integrated Circuits, Product Note entitled: "High Power-Factor Preregulator," UC1852, UC2852, UC3852, 10 pages, Texas Instruments © 2008.

On Semiconductor, Product Note entitled: "Compact Fixed Frequency Discontinuous or Critical Conduction Voltage Mode Power Factor Correction Controller," NCP1601A, NCP1601B, 18 pages, © Semiconductor Components Industries, LLC, Jul. 2009—Rev. 5.

Renesas, Product Note entitled: "Critical Conduction Mode PFC Control IC," R2A20113SP, REJ03F0279-0200, Rev.2.00, Jul. 8, 2009.

* cited by examiner

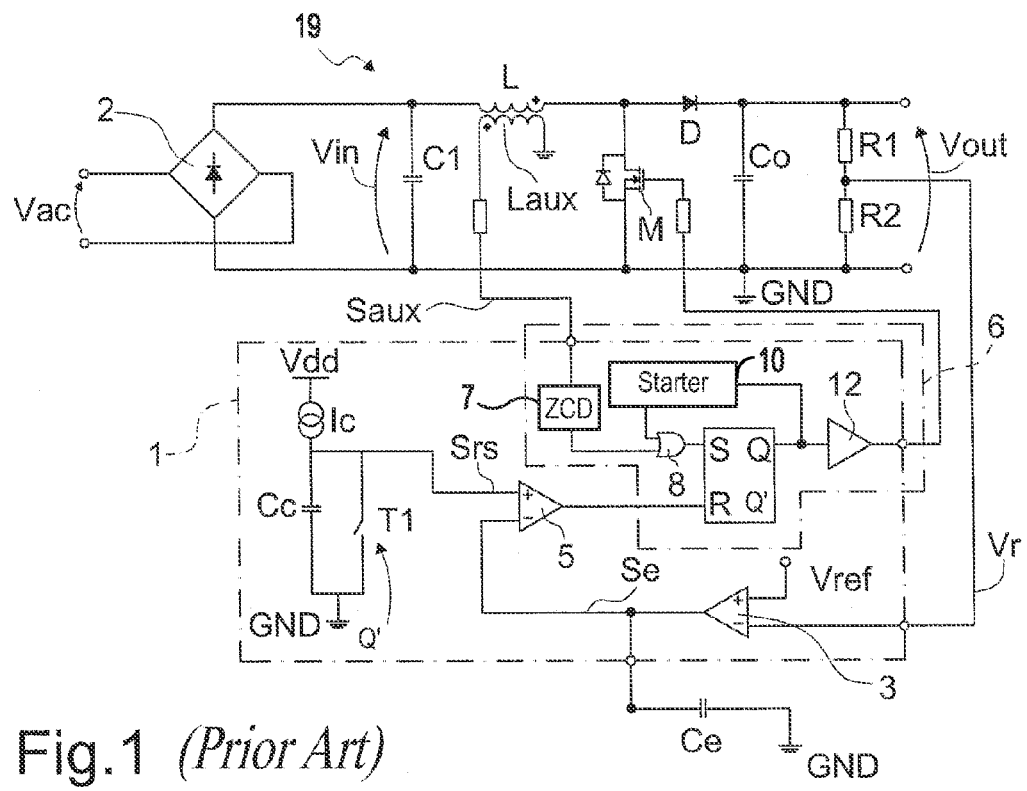
Fig. 1 *(Prior Art)*
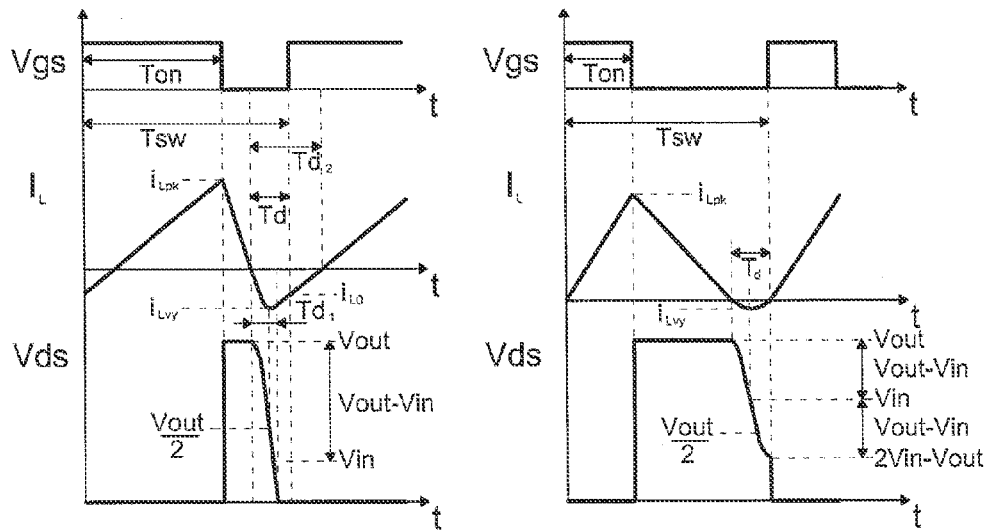
Fig. 2
*(Prior Art)*

CONTROL DEVICE OF A SWITCHING POWER SUPPLY

BACKGROUND

1. Technical Field

The present disclosure relates to a control device of a switching power supply.

2. Description of the Related Art

It is generally known to use devices for actively correcting the power factor (PFC) of switching power supplies used in electronic apparatuses of common use such as computers, televisions, monitors, etc. and for supplying power to fluorescent lamps, i.e., switching pre-regulator stages which absorb a current from the power line, said current being quasi-sinusoidal and in phase with the supply voltage. A switching power supply of the current type thus comprises a PFC and a DC-DC converter connected to the PFC output.

A typical switching power supply comprises a DC-DC converter and an input stage connected to the power distribution line which comprises a full-wave diode rectifier bridge and a capacitor connected downstream so as to produce a non-regulated direct voltage from the sinusoidal alternating supply voltage. The capacitor has a great enough capacitance for a relatively small ripple to be present at its terminals as compared to a direct level. Therefore the rectifier diodes of the bridge will only conduct over a short portion of each half cycle of the supply voltage, as the instantaneous value thereof is less than the voltage of the capacitor over most of the cycle. The result is the current absorbed by the power line consists of a series of short impulses the amplitude of which is 5-10 times the resulting average value.

This has significant consequences: the current absorbed from the power line has peak and rms (root-mean-square) values much higher than the case of sinusoidal current absorption, the supply voltage is distorted due to the almost simultaneous impulse absorption of all utilities connected to the power line, the current in the neutral conductor in the case of three-phase systems is highly increased and there is low use of the energy potentials of the power system. In fact, the waveform of impulse current includes many odd harmonics, which although they do not contribute to the power provided to the load, they contribute to increasing the rms current absorbed by the power line and therefore to increasing the energy dissipation.

In quantitative terms, this may all be expressed both in terms of Power Factor (PF), which is a ratio of the real power (the one the power supply sends to the load plus the one dissipated therein in the form of heat) to the apparent power (the product of the rms voltage by the rms current absorbed), and in terms of Total Harmonic Distortion (THD), generally intended as percentage ratio of the energy associated with all larger harmonics to the one associated with the fundamental harmonic. Typically, a power supply with capacitance filter has a PF between 0.4 and 0.6 and a THD higher than 100%.

A PFC arranged between the rectifier bridge and the input of the DC-DC converter allows a current quasi sinusoidal and phased with the voltage, to be absorbed from the network, thus making the PF close to 1 and decreasing the THD.

FIG. 1 schematically shows a PFC pre-regulator stage comprising a boost converter 19 and a control device 1. The PWM control device has a variable frequency, also called "Transition Mode" (TM) as the device works on the borderline between the continuous (CCM) and discontinuous (DCM) modes of conducting current through the inductor; in particular, device 1 is of the constant Ton type. According to this method, the turn-on period of the power transistor is used as a control variable and, during each cycle of the supply voltage, it is kept constant at the appropriate value to obtain the regulation of the voltage output from the converter 19, by means of a feedback control loop. The boost converter 19 comprises a full-wave diode rectifier bridge 2 having an input supply voltage Vac, an input capacitor C1 (which serves as a high frequency filter) having a terminal connected to the diode bridge 2 and the other terminal connected to ground GND and on which a voltage Vin exists, an inductance L connected to a terminal of the input capacitor C1, a MOS power transistor M having a drain terminal connected to a terminal of the inductance L downstream of the latter and having a source terminal connected to ground GND, a diode D having an anode connected to the common terminal of the inductance L and the transistor M, and a cathode connected to an output capacitor Co having the other terminal connected to ground GND. The boost converter 19 generates an output direct voltage Vout across the output capacitor Co which is higher than the maximum peak supply voltage, typically 400 V for systems powered by a European power line or universal power line. Such a voltage Vout will be the input voltage of the DC-DC converter connected to the PFC.

The control device 1 should keep the output direct voltage Vout at a constant value by means of a feedback control action. The control device 1 comprises an operational error amplifier 3 adapted to compare part of the output voltage Vout, i.e., the voltage Vr given by Vr=R2×Vout/(R2+R1) (where the resistances R1 and R2 are connected in series to each other and the series is in parallel to the output capacitor Co) with a reference voltage Vref, e.g., of the value of 2.5 V, and generates an output error signal Se across a capacitor Ce connected between the output of amplifier 3 and ground GND.

The error signal Se is sent to the inverting input of a comparator PWM 5 while the signal Srs exists at the non-inverting input; the signal Srs is a voltage ramp across a capacitor Cc powered by a current generator Ic in the time periods whenever the switch T1 is open, which coincide with those when M is on, as the duration Ton of the turn-on of M is to be controlled. If signals Srs and Se are equal, the comparator 5 sends a signal to a control block 6 adapted to control the transistor M and which, in this case, turns it off. Block 6 comprises a zero current detecting (ZCD) block 7 having at the input the signal Saux deriving from the inductor Laux coupled with the inductor L; the signal Saux is representative of the demagnetization of the core of the transformer formed by the inductances L and Laux. Block 7 is capable of sending an impulse signal to a OR gate 8, the other input of which is connected to a starter 10, adapted to send a signal to the OR gate 8 at the initial instant of time; the output signal S of the OR gate 8 is the set input S of a set-reset flip-flop 11 having another input R which is the signal at the output from the comparator 5, and having an output signal Q and a negated output signal Q', which is opposite to the signal Q. The signal Q is sent to the input of a driver 12 which controls the turn-on or turn-off of the transistor M and therefore the duration of the turn-on time period Ton and the turn-off time period Toff in each switching cycle Tsw while the signal Q' controls the closing and opening of switch T1.

FIG. 2 shows the time diagrams of some signals involved in the circuit in FIG. 1, i.e., the voltage between the gate and source terminals of transistor M Vgs, the voltage between the drain and source terminals of transistor M Vds and the current in inductor $I_L$.

In TM operation, operation is never exactly done at the borderline between DCM and CCM but slightly in DCM. In fact, the transistor M is not turned on, typically, when the current of the inductor is zeroed, as the voltage Vds in that moment is still equal to the output voltage Vout (typically 400 V); therefore, a parasitic capacitance (Cd) associated with the drain terminal at that moment has energy equal to ½·Cd·Vout² which would be dissipated in the resistance $R_{DS(on)}$ of transistor M when it is turned on. If instead the turn-on is delayed until the oscillation of voltage Vds resulting from zeroing the current $I_L$ of the inductor reaches its minimum, equal to 2Vin−Vout, the power stored in the parasitic capacitance and dissipated in the transistor M at the turning-on is considerably reduced.

Moreover, if 2Vin−Vout<0 (i.e., Vin<Vout/2), where the body diode of transistor M substantially cuts the oscillation to zero, these energy losses would be zeroed resulting in the so-called "soft-switching". In part due to their operation and in part due to the introduction of intentional delays, zero current detection circuits or ZCD inside the controllers PFC, such as that shown in FIG. 1, allow the transistor M to be turned on at the drain oscillation valley ("valley switching"); this delay is indicated by Td, which is equal to half the period of said oscillation. This slightly moves the operation in DCM, but the remarks made on the pure TM are still valid, at least until Td is negligible with respect to the switching period, which typically occurs in a fairly large field of operating conditions of the converter if values Vin>>0 are considered, which are the significant ones in terms of the power transfer.

BRIEF SUMMARY

During the oscillation of voltage Vds, the current $I_L$ of inductor L becomes negative, by passing through the parasitic capacitance of transistor M and, also possibly the body of transistor M if the voltage Vds reaches zero and, thus, directly biases it.

In this latter case, shown in the left-hand time diagrams, the voltage Vds reaches zero after a time $Td_1$<Td; until that moment, the current $I_L$ of the inductor is sinusoidal, but from this moment on, due to the turning on of the body diode, which sets a voltage substantially equal to Vin at its terminals, it starts linearly increasing and at the instant Td is still negative. At this point, the transistor M (the voltage Vgs is forced high) is turned on and the direct current ramp starts. The current becomes positive at the instant $Td_2$>Td. Therefore, there is a time interval in which transistor M is turned on, but the current $I_L$ of the inductor is negative. It should be noted that, if the input voltage is such that the peak voltage Vpk is Vpk<Vout/2 (which occurs with the American or Japanese power line, for example), this time interval exists in the entire power line cycle. The ratio of the duration of this interval to that of the switching cycle becomes increasingly greater as the voltage Vin decreases, thus reaching the maximum at the zeroes of the supply voltage (Vin=0). In addition to this, as the current peak tends to zero when Vin tends to zero, the negative peak of the inductor current may even become higher than the positive peak around the zeros of the supply voltage.

If 2Vin−Vout>0 (i.e., Vin>Vout/2), the oscillation valley of the voltage Vds remains at a positive value and the body diode is not turned on. Therefore, the negative portion of the current of the inductor is entirely a sinusoidal arch and the current is zero at the instant Td when transistor M is turned on (i.e., $Td_2$=Td). Therefore, the time interval when the current is negative with the transistor M turned on is absent, but the negative peak of the inductor current (in this case of lower amplitude because the oscillation of voltage Vds is of lower amplitude) may be comparable to the positive peak around the zeroes of the supply voltage.

The current $I_L$ of the inductor linearly rises with a slope of $$\frac{dI_L}{dt} = \frac{Vin}{L}$$

in each turn-on cycle of transistor.

Since the input voltage is sinusoidal, Vin=Vpk sin θ where θ is the phase angle of the supply voltage, therefore:

$$\frac{dI_L}{dt}(\theta) = \frac{Vpk}{L}\sin\theta.$$

Considering the initial value $I_{LO}$ of the inductor current when transistor M is turned on, the peak value of the current of the inductor will be:

$$I_{Lpk}(\theta) = I_{L0} + \frac{Vpk}{L}Ton \cdot \sin\theta,$$

$I_{LO}$=0 if Vin>Vout/2 while, by neglecting the variation of current in the interval between Td/2 and $Td_1$, if Vin<Vout/2, $I_{LO}$ may be assumed to be equal to the negative peak $I_{Lvy}$ (which occurs at the instant $Td_2$), which is equal to:

$$I_{L0} \approx I_{Lvy} = \frac{Vin - Vout}{Zd} = \frac{Vpk\sin - Vout}{Zd},$$

where Zd is the characteristic impedance of the resonant circuit consisting of the inductor and the parasitic capacitance on the drain terminal. Therefore, considering the preceding equations:

$$I_{Lpk}(\theta) = \begin{cases} -\frac{Vout}{Zd} + Vpk\sin\theta\left(\frac{1}{Zd} + \frac{1}{L}Ton\right) & Vpk\sin\theta < Vout/2 \\ \frac{Vpk}{L}Ton \cdot \sin\theta & Vpk\sin\theta \geq Vout/2 \end{cases}$$

Therefore with a constant period Ton, there is only a sinusoidal envelope of the peak current for instantaneous values of the supply voltage which are higher than Vout/2. There is a reduction of the peak value $I_{Lpk}(\theta)$ for values less than Vout/2 and, accordingly, a distortion of the envelope due to the constant term—Vout/Zd, which reduction is as great as said instantaneous voltage is low. It is obvious that said distortion results in the distortion of the mains current and therefore in a greater THD and a lower PF.

Furthermore, the reduction of the peak current has a further deleterious action on the THD: the increase of crossover distortion, seen as a brief flat zone in the waveform of the input current close to the zeroes of the supply voltage.

This distortion growing as the load of the PFC decreases and as the rms supply voltage increases, derives from the input-output energy transfer defect which occurs close to the zeros of the supply voltage. In that zone, the energy stored in the inductor—linked to the peak value of the current—is very low, insufficient to charge the parasitic capacitance Cd until reaching the voltage Vout (typically 400 V) so as to turn on the diode D and transfer the power of the inductor to the output. Therefore, the diode is not turned on over a certain number of switching cycles and the energy is partially returned to the filter capacitor arranged downstream the rectifier bridge. This is not discharged and keeps the bridge in inverse bias, by deleting the input current and performing a dead zone in the waveform of the line current.

The fact that the peak current for a given Ton is lower than the one expected in the region wherein Vin<Vout/2, results that the power transported around the zeroes of the supply voltage is further reduced with respect to the case of sinusoidal envelope. Thereby, the number of switching cycles is increased, in which there is no power transfer towards the output and, therefore, the dead zone of the current absorbed by the network widens, with the consequential increase of THD and further reduction of PF.

Moreover the capacitor C1 of the boost converter in FIG. 1 absorbs a current given by:

$$Ic1 = C\frac{dVin}{dt}.$$

Said current is a further distortion element; said current, added to the current absorbed by the converter, results in a greater distortion of the current absorbed by the power line.

In view of the state of the art, an embodiment provides a control device of a switching power supply which reduces or eliminates said further distortion element.

One embodiment of the present disclosure is a control device of a switching converter, said converter having an input alternating supply voltage and a regulated direct voltage on the output terminal, said converter comprising a switch connected to an inductor and said control device being adapted to control the closing and opening time period of said switch for each cycle, said control device comprising first means adapted to generate a ramp voltage and second means adapted to determine the final instant of the closing period of the switch by comparing said ramp voltage with a first voltage, said control device receiving a second input signal representative of the current flowing through at least one element of the converter. The control device is configured to receive a third signal having a value different from zero and comprises further means configured to synchronize the start of the ramp voltage with the crossing of said second signal and said third signal, with said switch being closed.

According to an embodiment, a circuit for controlling a switching converter is provided, and includes a ramp voltage generator circuit, a switch control signal generator circuit, and a ramp voltage generator control circuit. The switch control signal generator circuit is configured to change a switch control signal from a first state to a second state in response to a comparison of a ramp voltage produced by the ramp voltage generator circuit with a voltage corresponding to a regulated output voltage of the switching converter. The ramp voltage generator control circuit is configured to enable operation of the ramp voltage generator circuit in response to an input signal corresponding to a value of a current flowing in an inductor of the switching converter.

While the switch control signal is in the first state, the ramp voltage generator control circuit enables operation of the ramp voltage generator circuit when the input signal is equal to—i.e., crosses—a comparison signal. The comparison signal can be a reference value, or can be derived from one or more values present in the converter.

According to an embodiment, a minimum delay is introduced between a transition of the switch control signal from the second state to the first state and enablement of the ramp voltage generator circuit.

BRIEF DESCRIPTION OF THE SEVERAL VIEWS OF THE DRAWINGS

The features and advantages of the disclosed embodiments will become apparent from the following detailed description, illustrated only by way of non-limitative examples in the annexed drawings, in which:

FIG. 1 shows a control device of a switching power supply in accordance with the known art;

FIG. 2 shows the time diagrams of some signals involved in the circuit in FIG. 1 if Vin<Vout/2 or Vin>Vout/2;

DETAILED DESCRIPTION

Figure 3:
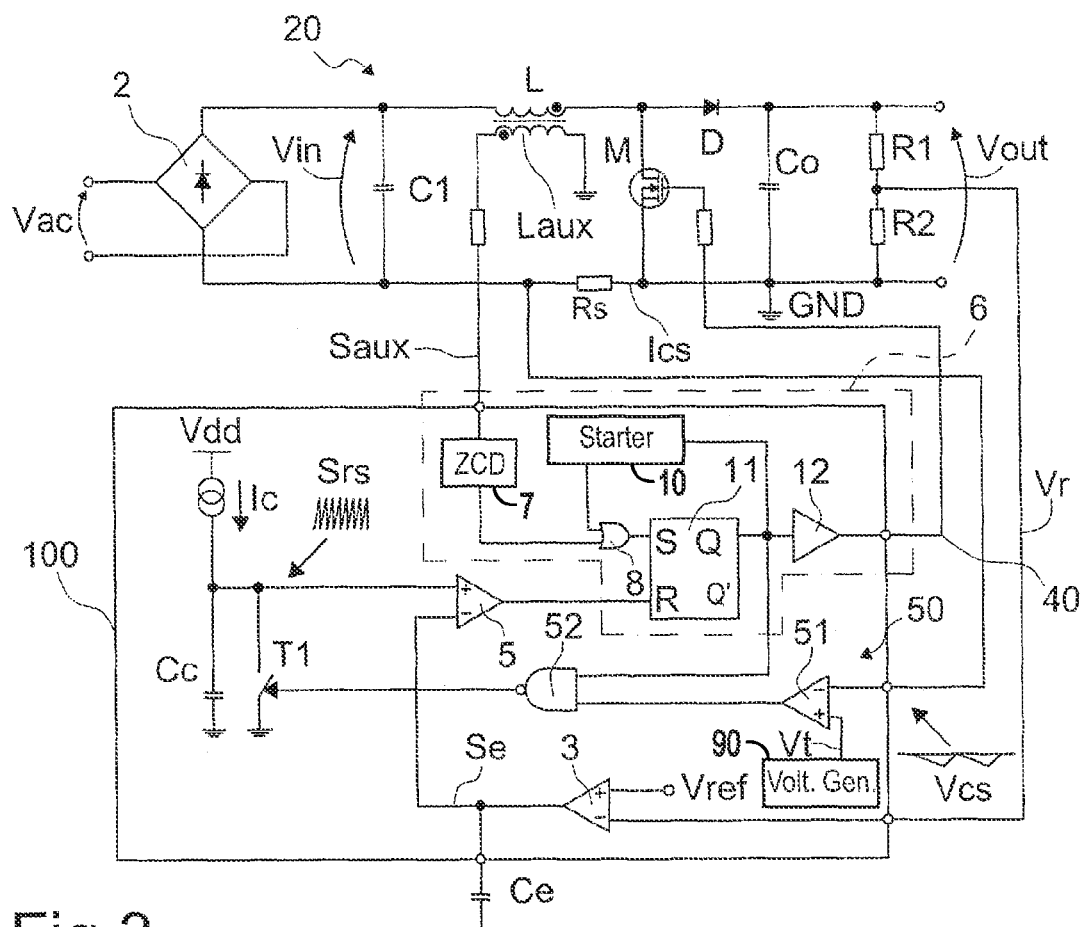
FIG. 3 shows a control device of a switching power supply in accordance with a first embodiment.

With reference to FIG. 3, a control device 100 of a switching power supply in accordance with an embodiment is shown. The power supply comprises a converter 20, preferably a boost converter, having an input alternating supply voltage Vac and a regulated voltage Vout at the output terminal Out. The converter 20 comprises a switch M, preferably a MOS power transistor and the control device 100 is adapted to control the on time period Ton and the off time period Toff of said switch M at each cycle Tsw. The device 100 comprises a ramp generator, including elements Ic, Cc, T1, adapted to generate a ramp voltage Srs and turn-off circuitry having elements 5, 11, 12 adapted to determine the final instant of the on period Ton of switch M by comparing said ramp voltage Srs with a first voltage Se. A current detector, preferably a resistance Rs of the converter 20, is adapted to detect the value of the current Ics flowing through at least one element L, M, of the converter. The control device 100 comprises a synchronizer 50 adapted to synchronize the start Tstart of the ramp voltage Srs with the crossing of the signal Vcs, which is representative of the current flowing through the converter, by another signal Vt having a value different from zero, with the switch M being closed. In particular, the synchronization occurs exactly or with a short delay Tleb.

The boost converter 20 comprises a full-wave diode rectifier bridge 2 having an input supply voltage Vac, and an input capacitor C1 (which serves as a high frequency filter) having first and second terminals, respectively connected to the diode bridge 2 and to ground GND by the resistance Rs, across which a voltage Vin exists, an inductance L connected to the first terminal of the input capacitor C1, a MOS power transistor M having the drain terminal connected to a terminal of the inductance L downstream of the latter and having the source terminal connected to ground GND, a diode D having the anode connected to the common terminal of the inductance L and the transistor M, and the cathode connected to a first terminal of an output capacitor Co having a second terminal connected to ground GND. The boost converter 20 generates an output direct voltage Vout across output capacitor Co which is higher than the maximum peak supply voltage, typically 400 V for systems powered by a European power line or universal power line. Such a voltage Vout will be the input voltage of the DC-DC converter connected to the PFC.

The control device 100 should keep the output voltage Vout at a constant value by means of a feedback control action. The control device 100 comprises an operating error amplifier 3 adapted to compare a portion of the output voltage Vout, i.e., the voltage Vr given by $Vr=R2 \times Vout/(R2+R1)$ (where the resistances R1 and R2 are connected in series to each other and the series is in parallel to the capacitor Co) with a reference voltage Vref, e.g., of the value of 2.5 V, and generates an output error signal Se across a capacitor Ce connected between the output of the amplifier 3 and ground GND.

The error signal Se is sent to the inverting input of a PWM comparator 5 while the signal Srs exists at the non-inverting input; the signal Srs is a voltage ramp across a capacitor Cc charged by a current generator Ic in the time periods wherein the switch T1 is open, which coincide with those when transistor M is on. If the signals Srs and Se are equal, the comparator 5 sends a signal to a control block 6 adapted to control the transistor M and which, in this case, turns it off. Block 6 comprises a zero current detecting block 7 having an input receiving the signal Saux from the inductor Laux coupled with the inductor L; the signal Saux is representative of the demagnetization of the core of the transformer formed by the inductances L and Laux. Block 7 is capable of sending an impulse signal to a OR gate 8, the other input of which is connected to a starter 10 adapted to send a signal to the OR gate 8 at the initial instant of time; the output signal S of OR gate 8 is the set input S of a set-reset flip-flop 11 having another input R which is the signal at the output from the comparator 5, and having an output signal Q. The signal Q is sent to the input of a driver 12 which controls the turn-on or turn-off of the transistor M by means of the signal GD.

The synchronizer 50 is adapted to synchronize the triggering of the voltage ramp Srs, used to generate the time period Ton, when the value of the inductor current Ics is equal to the signal Vt having a value different from zero, which occurs immediately after or simultaneously with the turn-on of the MOS transistor M. Thereby, the duration of the time period Ton will coincide substantially with the duration of the positive ramp Srs, both for Vin<Vout/2 values and for Vin>Vout/2 values, and the envelope $I_{Lpk}(\theta)$ of the peaks of the inductor current Ics will be a sinusoidal arch for all values of Vin, from zero to Vpk.

The control device 100 is typically integrated in a small silicon chip except the capacitor Ce which is generally outside the integrated circuit.

The voltage Vt is a generated by a voltage generator 90. The voltage Vt is preferably a prefixed voltage Vth; in this case, the voltage generator 90 is inside the chip and is constituted of a fixed reference. The voltage generator 90 is preferably connected to the non-inverting input terminal of the comparator 51, but according to another embodiment, is connected to the inverting input terminal of the comparator 51, with the signal Vcs connected to the non-inverting input terminal.

In accordance with a first embodiment of the disclosure, the resistance Rs is introduced on the path toward ground GND of the current; the current Ics of the inductor L flows through this resistance, whereby such a current is shown in scale Rs by the drop of the voltage Vcs (negative with respect to ground) across said resistance. A current sensing system of the inductor is typically used for safety purposes to prevent the peak currents from reaching values dangerous for the power elements of the boost in the case of operation disturbances. Hence, the addition of this element is not an additional cost for the control device 100.

Again in accordance with the first embodiment of the disclosure, the synchronizer 50 includes a comparator 51 having its non-inverting input connected to the signal Vt and its inverting input connected to the resistance Rs and is adapted to compare the voltage Vcs across the resistance Rs—inverted image of the inductor current $I_L$—with the signal Vt. The synchronizer 50 also comprises a logic circuit, for example a NAND gate 52 powered by the signal Q and by the output of comparator 51. The signal at the output from the NAND gate 52 controls the closing and opening of the switch T1.

Figure 4:
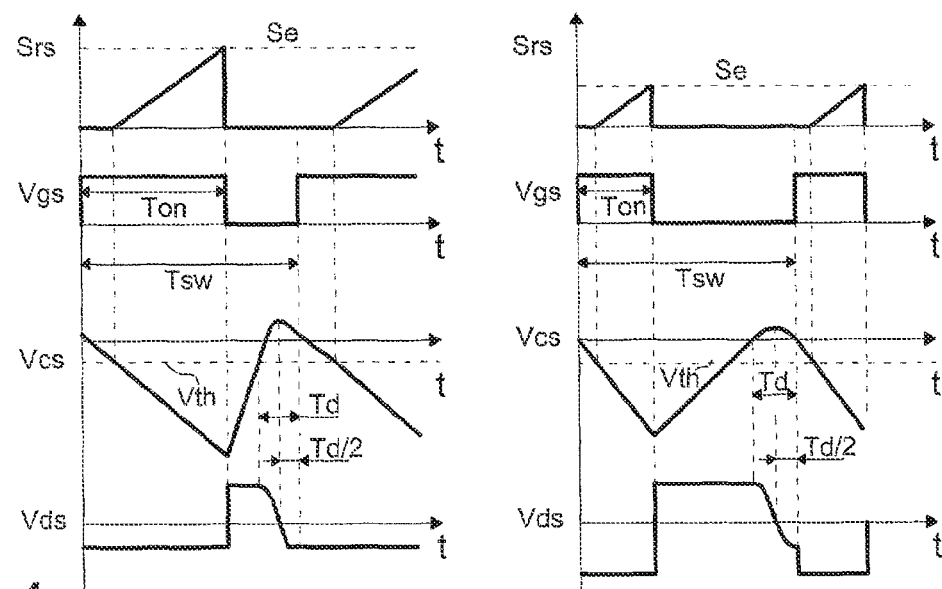
FIG. 4 shows the time diagrams of some signals involved in the circuit in FIG. 3 if Vin<Vout/2 or Vin>Vout/2.

FIG. 4 shows the time diagrams of some signals involved in the circuit in FIG. 3, i.e., the voltage Vgs between the gate and source terminals of the transistor M, the voltage Vds between the drain and source terminals of the transistor M, the ramp voltage Srs and the voltage Vcs across the sense resistance Rs.

Figure 5:
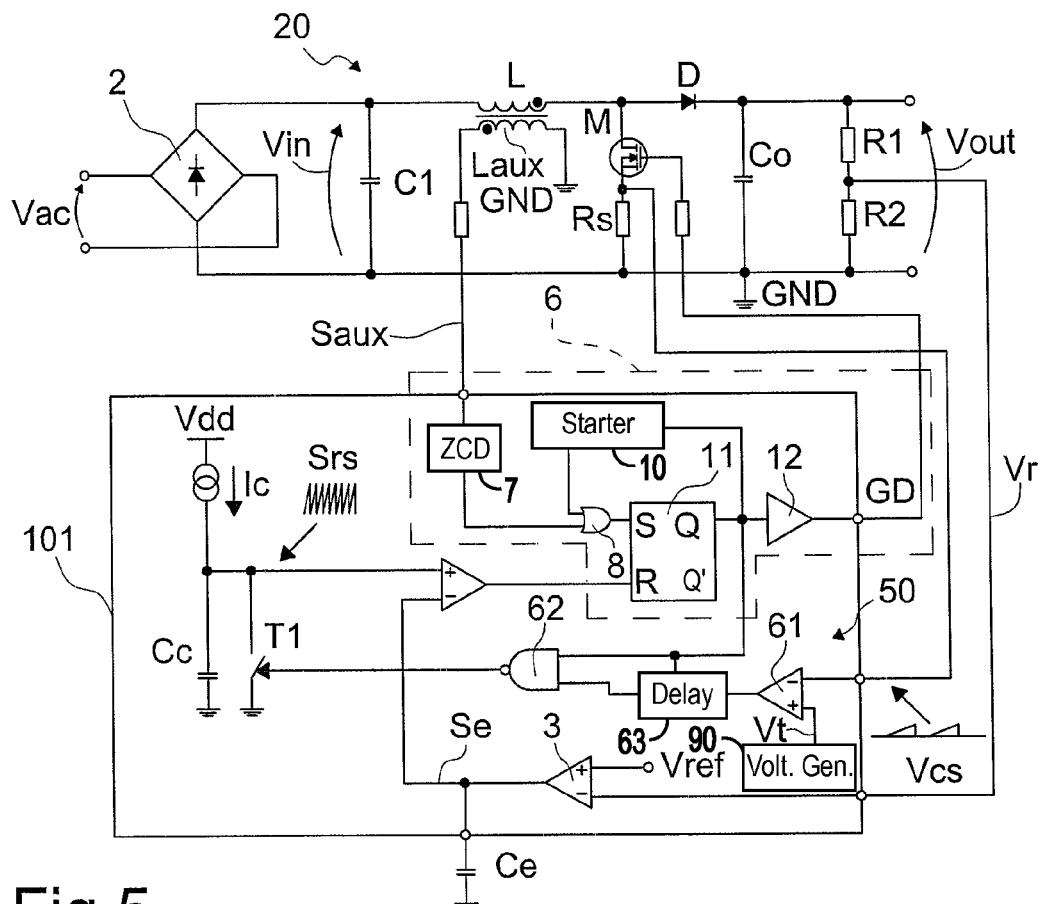
FIG. 5 shows a control device of a switching power supply in accordance with a second embodiment.

A second embodiment of the present disclosure is shown in FIG. 5 and includes a switching converter 21 and a control device 101. The switching converter 21 is similar to the switching converter 20 in FIG. 3 except that it includes a boost stage 23 in which the resistance Rs is arranged in series to the source terminal of the transistor M, thereby only detecting the part of inductor current $I_L$ during the conduction step of the transistor M.

The control device 101 includes a synchronizer 60 which comprises all the devices as disclosed with reference to the synchronizer 50 of FIG. 3 or, alternatively, as disclosed in FIG. 5, comprises a comparator 61 having its non-inverting input connected to the resistance Rs and the inverting input connected to the signal Vt and adapted to compare the voltage Vcs across the resistance Rs, which is representative of the current circulating through the switch M, with the signal Vt. The synchronizer 60 in FIG. 5 also comprises a logic circuit, for example a NAND gate 62 powered by the signal Q and by the output of the comparator 61 which is delayed by means of a masking time period Tleb by a delay device 63. The output signal from the NAND gate 62 controls the closing and opening of switch T1.

The device 63 also receives the input signal Q and, for a pre-fixed time Tleb from the instant when the signal Q becomes high, provides a low output level independently from the status of the output of comparator 61; once the time Tleb has elapsed, the device 63 transfers the status of comparator 61 to the output.

The presence of device 63 is used in this current sensing configuration because when transistor M is turned on, a disturbance flows through the resistance Rs which overlaps the useful signal representing the inductor current. Such a disturbance, which occurs as a positive spike called "leading-edge spike", derives from two fundamental contributions: the first is the charging current of the gate capacitance, the second is the discharge current of the parasitic capacitance of the drain terminal of MOS M. Both the currents pass through the resistance Rs going to ground GND, whereby they generate a positive signal, precisely the leading-edge spike. This is particularly apparent when the voltage between the drain and source terminals of transistor M is positive at turning on, i.e., for Vin>Vout/2, because the discharge current of the drain terminal is typically predominant. However, in this case, the spike would not alter the circuit operation because the signal on Rs would be positive in any case. However, in the presence of a gate charging current, the spike could also be significant if Vin<Vout/2 and anticipate the triggering of the ramp. Therefore, the use of device 63 is useful to obtain improved immunity against this disturbance.

Figure 6:
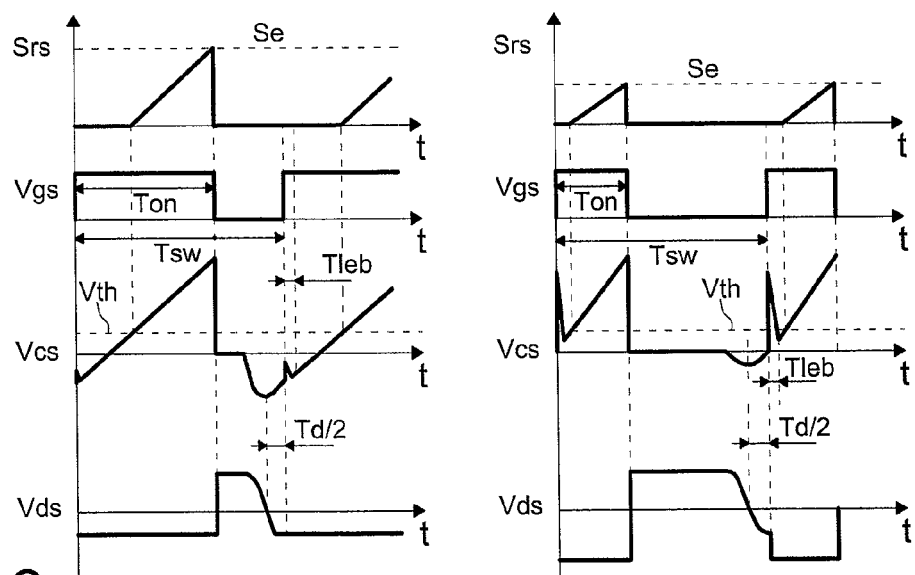
FIG. 6 shows the time diagrams of some signals involved in the circuit in FIG. 3 with the implementation of the time delay Tleb if Vin<Vout/2 or Vin>Vout/2.

FIG. 6 shows the time diagrams of some signals involved in the circuit in FIG. 5, i.e., the voltage Vgs between the gate and source terminals of transistor M, the voltage Vds between the drain and source terminals of transistor M, the ramp voltage Srs and the voltage Vcs across of the resistance Rs. As the duration of the time period Tleb is very short (typically between 150 and 300 ns), the presence of device 63 is practically transparent when Vin<Vout/2, whereas it introduces a delay substantially equal to Tleb when Vin>Vout/2.

Figure 7:
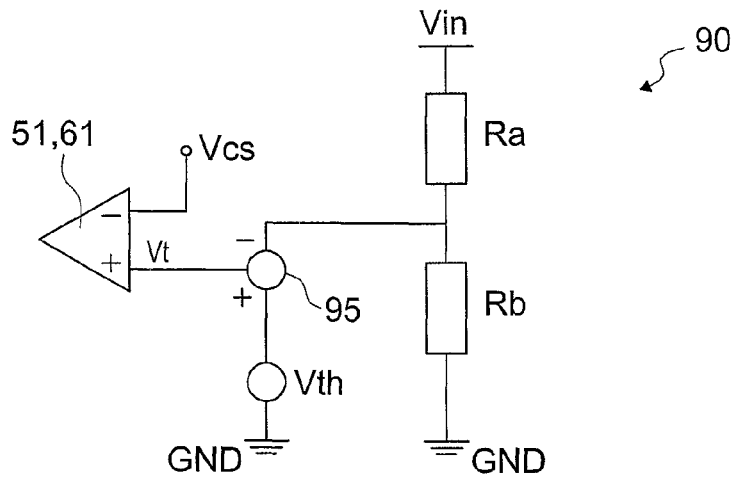
FIG. 7 shows a part of the control device of a switching power supply in accordance with a variant of the first or second embodiment.

According to a variant of the first and second embodiment, the voltage Vt depends on the voltage Vin across the input capacitor C1. Preferably, as shown in FIG. 7, the voltage Vt is given by the difference between the fixed voltage Vth and the voltage $$Vinr = \frac{Vin}{Ra + Rb} Ra$$

at the node 95. The voltage divider preferably is inside the chip but can be arranged outside the chip; the circuitry 90 comprises the fixed reference Vth and the voltage divider of the resistances Ra and Rb arranged between the signal Vin and ground GND. While employing a more complex hardware than a fixed voltage, this solution allows to compensate more accurately the negative current peak and obtain better power factor and total harmonic distortion.

Figure 8:
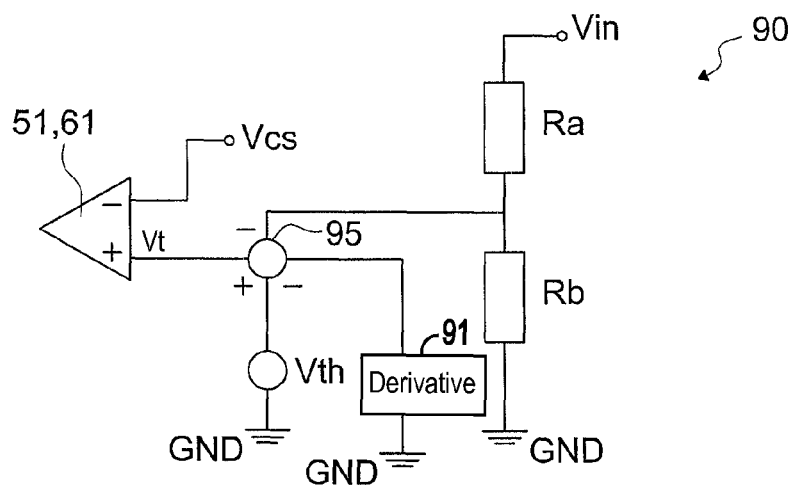
FIG. 8 shows a part of the control device of a switching power supply in accordance with another variant of the first or second embodiment.

According to another variant of the first and second embodiments, the voltage Vt depends on the voltage Vin across the input capacitor C1 and on the derivative of the voltage Vin; in this case the voltage generator 90 comprises the fixed reference Vth, the voltage divider with the resistances Ra and Rb and a derivative block 91 adapted to generate derivative of the voltage Vin. The voltage generator 90 is connected with the non-inverting input terminal of the comparator 51, 61 as shown in FIG. 8. This solution allows to compensate the parasitic current flowing through the input capacitor C1, obtaining further improvements in the power factor.

Figure 9:
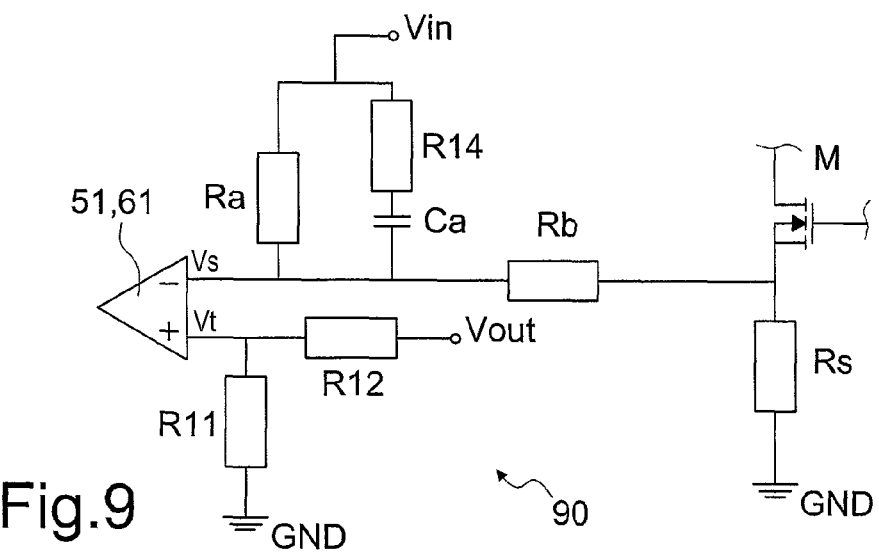
FIG. 9 shows a part of the control device of a switching power supply in accordance with a further variant of the first or second embodiment.

According to a further variant of the first and second embodiments, a voltage Vs depends on the voltage Vin across the input capacitor C1 and on the derivative of the voltage Vin, while the voltage Vt depends on the output voltage Vout, as shown in FIG. 9. The voltage $$Vt = \frac{Vout}{R11 + R12} R11,$$

and is present at the non-inverting terminal of the comparator 51, 61, while the voltage Vs is present at the inverting input terminal of the comparator 51, 61, which is connected by means of a resistance Rb with a terminal of the sense resistance Rs, which has the other terminal connected to ground GND, and by means of the resistance Ra with the voltage Vin. The inverting input terminal of the comparator 51, 61 is connected by means of a series of the resistance R14 and the capacitor Ca with the voltage Vin.

The resistances R11 and R12 increase the voltage Vt proportionally to Vout, the resistances Ra and Rb increase the voltage Vs proportionally to Vin, and the series of R14 and Ca with the resistance Rb increase the voltage Vs proportionally to the derivative of Vin.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
   a switching converter having:
      an input terminal configured to receive an alternating current supply voltage,
      an output terminal configured to provide a regulated direct current voltage,
      an inductor coupled between the input terminal and the output terminal,
      a current detector configured to provide a sensed signal corresponding to a current that is equal or proportional to a current through the inductor of the converter, and
      a switch coupled between the inductor and a circuit ground; and
   a control device configured to control closing and opening of said switch, said control device having:
      a ramp voltage generator circuit configured to generate a ramp voltage,
      a switch control circuit configured to open the switch based on a comparison of the ramp voltage with a first voltage, and
      a generator control circuit configured to receive the sensed signal, receive a first reference signal having a value different from zero, and synchronize the start of the ramp voltage with a crossing of the sensed signal and the first reference signal while the switch is already in a closed state prior to the synchronization.

2. The device according to claim 1, wherein the switching converter comprises a rectifier circuit configured to rectify the alternating current supply voltage and a capacitor arranged in parallel with the rectifier circuit, and wherein the current detector is positioned between the switch and the rectifier circuit and is configured to provide the sensed signal corresponding to a current through the current detector.

3. The device according to claim 1, wherein the switching converter comprises a rectifier circuit configured to rectify the alternating current supply voltage and a capacitor arranged in parallel with the rectifier circuit, and wherein the first reference signal is representative of a difference of a second reference signal and another signal representative of a voltage across said capacitor.

4. The device according to claim 1, wherein the switching converter comprises a rectifier circuit configured to rectify the alternating current supply voltage and a capacitor arranged in parallel with the rectifier circuit, and wherein the first reference signal is representative of a difference of a second reference signal and a sum of another signal representative of a voltage across the capacitor and a further signal representative of a derivative of the voltage across said capacitor.

5. The device according to claim 1, wherein: the switching converter comprises a rectifier circuit configured to rectify the alternating current supply voltage and a capacitor arranged in parallel with the rectifier circuit, the first reference signal is representative of a voltage at the output terminal of the converter, and the generator control circuit is configured to produce a ramp switch control signal representative of a difference between the first reference signal and a sum of another signal representative of the voltage across the capacitor and a further signal representative of a derivative of the voltage across the capacitor.

6. The device according to claim 1, wherein the ramp voltage generator circuit comprises a capacitor, a current source configured to supply a constant current to the capacitor and a generator switch arranged in parallel to the capacitor and wherein the generator control circuit comprises a logic circuit configured to control closing or opening of the generator switch in response to a value of a control signal of the switch control circuit and to the comparison of the sensed signal with the first reference signal.

7. The device according to claim 1, wherein the generator control circuit is configured to enable the ramp voltage generator circuit after a selected delay from the crossing of the sensed signal with the first reference signal.

8. The device according to claim 7, wherein the ramp voltage generator circuit comprises a capacitor, a current source for supplying a constant current to the capacitor and a generator switch parallel to said capacitor, the sensed signal being representative of a current flowing in the switch of the converter, and wherein the generator control circuit comprises a logic circuit configured to control the closing or opening of the generator switch, the logic circuit being configured to input a control signal of the switch control circuit and a further signal, delayed by the selected delay, representative of the crossing of the sensed signal with the first reference signal.

9. The device according to claim 1, wherein the switch control circuit comprises an error amplifier having a non-inverting input terminal configured to receive a reference voltage and an inverting input terminal configured to receive a voltage proportional to the voltage at the output terminal of the switching converter, the first voltage being representative of an output voltage of the error amplifier.

10. A circuit for controlling closing and opening of a switch of a switching converter, the switch being coupled between an inductor and a circuit ground of the switching converter, comprising: a ramp voltage generator circuit configured to produce a ramp voltage; a switch control circuit configured to change a switch control signal from a first state to a second state in response to a comparison of the ramp voltage with a voltage corresponding to a regulated output voltage of the switching converter, the second state being configured to open the switch; and a ramp voltage generator control circuit configured to synchronize the start of the ramp voltage with a first input signal, sensed across a current detector through which flows a current equal or proportional to a current flowing in the inductor of the switching converter, crossing a first reference signal while the switch is already in a closed state prior to the synchronization, the first reference signal having a value different from zero.

11. The circuit of claim 10, wherein the first reference signal is a fixed reference signal.

12. The circuit of claim 10, wherein the ramp voltage generator control circuit is configured to enable operation of the ramp voltage generator circuit while the switch control signal is in the first state.

13. The circuit of claim 12, wherein the ramp voltage generator control circuit comprises a delay circuit configured to prevent enablement of the ramp voltage generator circuit for at least a selected delay period following a transition of the switch control signal from the second state to the first state.

14. The circuit of claim 10, wherein the first reference signal corresponds to a voltage across an input capacitor of the switching converter.

15. The circuit of claim 10, wherein the ramp voltage generator control circuit is configured to enable operation of the ramp voltage generator circuit in response to a comparison of the first input signal with a second input signal corresponding to a voltage across an input capacitor of the switching converter in sum with a derivative of the voltage across the input capacitor.

16. The circuit of claim 10, wherein the first input signal corresponds to a value of the current flowing in the inductor of the switching converter, in combination with a voltage across an input capacitor of the switching converter and a derivative of the voltage across the input capacitor.

17. The circuit of claim 16, wherein the ramp voltage generator control circuit is configured to enable operation of the ramp voltage generator circuit in response to a comparison of the first input signal with a second input signal corresponding to the regulated output voltage of the switching converter.

18. A method, comprising: closing a switch coupled between an inductor of a switching converter and a circuit ground; initiating a ramp voltage, using a ramp voltage generator configured to generate the ramp voltage, while the switch is already in closed state prior to the initiating, when a first value, corresponding to a current across a current detector that is equal or proportional to a current flowing in the inductor, crosses a comparison value, the comparison value having a value different than zero; and opening the switch when a value of the ramp voltage is equal to a second value, corresponding to a regulated output voltage of the switching converter.

19. The method of claim 18, wherein the comparison value is a selected reference voltage.

20. The method of claim 18, comprising obtaining the comparison value from a voltage across an input capacitor of the switching converter.

21. The method of claim 20, wherein obtaining the comparison value from the voltage across the input capacitor comprises summing a value proportionate to the voltage across the input capacitor with a derivative of the voltage across the input capacitor.

22. The method of claim 18, comprising obtaining the second value by comparing the regulated output voltage with a reference voltage.

23. The method of claim 18, wherein initiating the ramp voltage comprises initiating the ramp voltage either when the first value is equal to the comparison value or at the end of a selected delay period following the closing the switch, whichever occurs later.

* * * * *